UNITED STATES PATENT OFFICE.

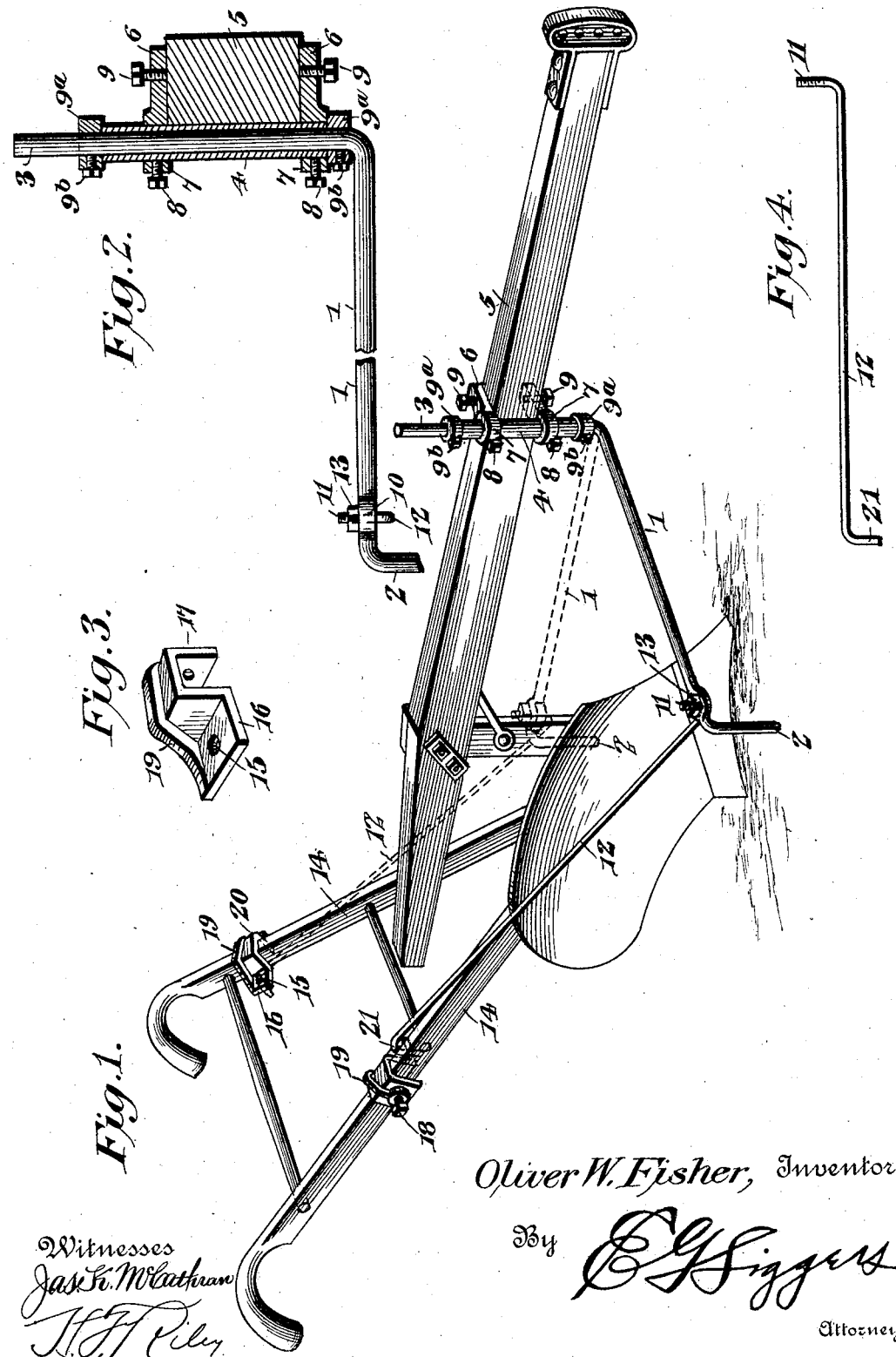

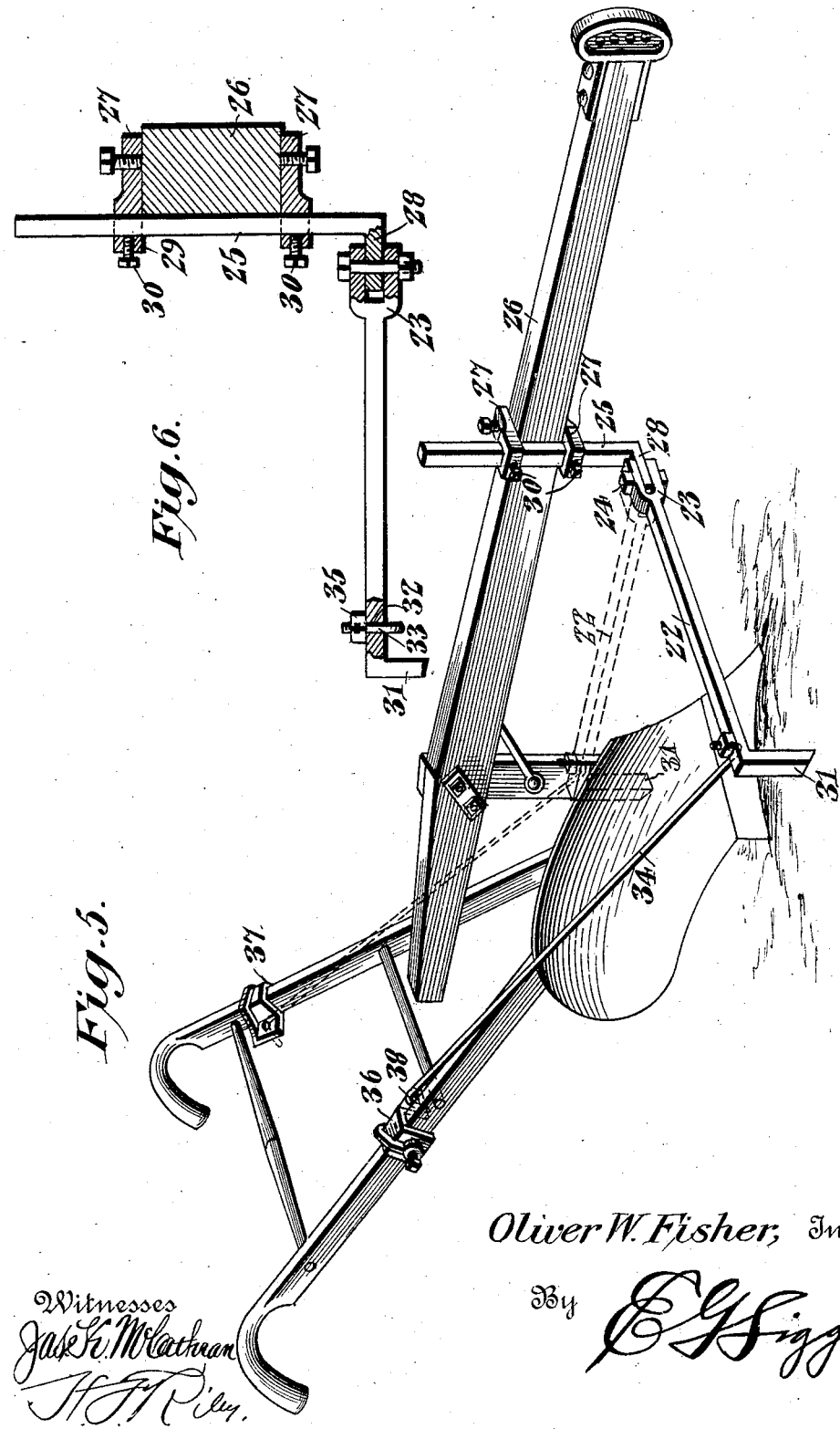

OLIVER WATSON FISHER, OF JERSEY SHORE, PENNSYLVANIA.

PLOW ATTACHMENT.

No. 845,169.  Specification of Letters Patent.  Patented Feb. 26, 1907.

Application filed March 27, 1906. Serial No. 308,229.

*To all whom it may concern:*

Be it known that I, OLIVER WATSON FISHER, a citizen of the United States, residing at Jersey Shore, in the county of Lycoming and State of Pennsylvania, have invented a new and useful Plow Attachment, of which the following is a specification.

The invention relates to a plow attachment for crushing down weeds, stubble, &c.

The object of the present invention is to provide a simple, inexpensive, and efficient device of great strength and durability adapted to be readily applied to a plow and capable of crushing down weeds, grass, and stubble and of leveling the same while plowing a field and adapted to be quickly arranged out of the way when it is desired to turn the plow at the end of a furrow.

A further object of the invention is to provide an attachment of this character which will be capable of vertical adjustment on the beam for arranging it at the proper elevation and which will be capable of adjustment longitudinally of the beam to position it properly with relation to the plowshare.

With these and other objects in view the invention consists in the construction and novel combination and arrangement of parts hereinafter fully described, illustrated in the accompanying drawings, and pointed out in the claims hereto appended, it being understood that various changes in the form, proportion, size, and minor details of construction within the scope of the claims may be resorted to without departing from the spirit or sacrificing any of the advantages of the invention.

In the drawings, Figure 1 is a perspective view of a plow attachment constructed in accordance with this invention and shown applied to a plow, the attachment being shown in operative position in full lines, the folded position of the same being illustrated in dotted lines. Fig. 2 is a transverse sectional view of the same. Fig. 3 is a detail perspective view of one of the handle-bar clamps. Fig. 4 is a detail view of the combined operating-rod and brace. Fig. 5 is a perspective view of a plow attachment, illustrating a modification of the invention and shown applied to a plow. Fig. 6 is a transverse sectional view of the same.

Like numerals of reference designate corresponding parts in all the figures of the drawings.

1 designates a horizontally-disposed bar designed to be arranged in advance of the plowshare for crushing down and leveling weeds, stubble, and similar growths and capable of vertical adjustment by the means hereinafter described to arrange it at the desired elevation, so that it will not interfere with the progress of the plow.

The bar 1 may be provided at its outer end with a depending arm 2, which is arranged to run in the furrow, and the inner end of the said bar 1 is bent upwardly and is arranged in a vertical position to form a stem 3. The stem 3 is round, and the stem and bar are preferably constructed of a single piece of heavy rod metal bent in the manner described.

The stem forms a pivot for hinging the inner end of the bar to the beam to permit the said bar to be swung inwardly and rearwardly from the position shown in full lines in Fig. 1 of the drawings to that illustrated in dotted lines in the said figure, whereby the attachment is arranged out of the way when turning the plow at the end of a row. The stem extends through a bearing-sleeve 4, which is adjustably secured to the beam 5 of the plow by means of upper and lower clamping jaws or members 6. The clamping jaws or members 6, which are arranged on the upper and lower faces of the plow-beam, are provided with eyes 7 to receive the bearing-sleeve 4. The eyes 7 are provided with circular openings to conform to the configuration of the bearing-sleeve, which is rigidly secured in the eyes by means of clamping-screws 8. The clamping-screws 8 are mounted in threaded perforations of the eyes 7 and engage the upper and lower portions of the sleeve, as clearly shown in Fig. 2 of the drawings. The beam-engaging portions of the clamping jaws or members are also rigidly secured to the said beam 5 by means of clamping-screws 9, which are arranged in threaded perforations of the said clamping jaws or members, and which engage the upper and lower faces of the beam.

The horizontal bar or member 1 is supported at the desired vertical adjustment by means of upper and lower collars $9^a$, arranged at the upper and lower ends of the sleeve 4, and provided with clamping-screws $9^b$, which are mounted in threaded perforations of the collars, and which are adapted to engage the stem, whereby the collars are rigidly secured to the same. The upper collar, which rests upon the upper end of the sleeve, supports the stem, and the lower collar, which engages the lower end of the sleeve, holds the stem against upward movement. These collars, which are adjustable on the stem, enable the latter to be raised and lowered to raise and lower the horizontal bar or member 1, and they do not interfere with the free swinging movement of the stem when it is desired to fold the bar or member 1, as hereinafter explained.

The outer portion of the horizontal bar 1 is preferably flattened and enlarged and provided with an eye or opening 10, through which passes the front end 11 of a combined operating-rod and brace 12. The combined operating-rod and brace 12 has its front end bent upwardly and passed through the eye 10, and it is secured in the eye by means of a nut 13, which engages suitable threads of the said end 11, but any other suitable means may be employed for this purpose. The operating-rod extends upwardly and rearwardly from the bar 1 to the adjacent handle-bar 14 of the plow, and it engages an aperture 15 of a projecting lip or flange 16 of a clamp 17. The handle-bar clamp 17, which is approximately U-shaped, fits over the upper edge of the handle-bar and the lip or flange projects from the inner side of the clamp. The outer side of the clamp is provided with a threaded perforation for the reception of a clamping-screw 18, which engages the handle-bar. The clamp is preferably reinforced by a rib 19. The other handle-bar 15 is provided with a similar clamp 20, which is adapted to be engaged by the outer end of the combined operating-rod and brace 12 for holding the bar 1 in a position substantially in parallelism with the plow-beam, whereby the said bar 1 will be out of the way and not interfere with the turning of the plow. The upper end 21 of the combined operating-rod and brace is bent downwardly to provide an angularly-disposed portion for engaging the openings of the lips or flanges of the said clamps.

In Figs. 5 and 6 of the drawings is illustrated a modification of the invention in which a horizontal bar or member 22 is employed. This bar or member, which is preferably rectangular in cross-section, but which may be of any desired configuration, has a forked inner end 23, which is pivoted by a vertical bolt 24 to the lower end of a vertical adjustable stem 25. The stem 25, which is secured to the beam 26 by upper and lower clamping-jaws 27, is provided at its lower end with an outwardly-extending horizontal arm 28, which fits into the space between the sides of the forked inner end of the bar or member 22.

The stem, which is preferably rectangular in cross-section, is secured in its adjustment by means of the clamping-jaws 27, which are provided with eyes 29, having rectangular openings to conform to the configuration of the stem 25. The eyes 29 are provided with clamping-screws 30, mounted in threaded perforations and engaging the stem, as clearly shown in Fig. 6 of the drawings.

The outer end of the horizontal bar or member 22 is provided with a depending arm 31, which extends into the furrow, similar to the depending arm 2, heretofore explained. The bar or member 22 is provided adjacent to the arm with a perforation 32 to receive the front end 33 of a combined brace and operating-rod 34. The front end 33 is bent upward and is threaded to receive a nut 35, which secures the end 33 in the opening 32. The operating-rod 34 extends upwardly and rearwardly from the horizontal bar or member 22 and is adapted to engage either one of a pair of handle-bar clamps 36 and 37, constructed in the same manner as those heretofore described. The upper end 38 of the combined operating-rod and brace is bent at an angle to engage the perforations of the lips or flanges of the clamps 36 and 37. The bar or member 22 is adapted to be swung inwardly and rearwardly from the position shown in full lines in Fig. 5 to that illustrated in dotted lines to fold the attachment out of the way, so that the same will not interfere with the turning of the plow at the end of a furrow.

It will be seen that in both forms of the invention the operating-rod is arranged within easy reach of the person operating the plow and that the horizontal bar or member may be readily arranged at right angles to the plow-beam for crushing down and leveling weeds, stubble, and similar growths, and that it is adapted to be quickly folded out of the way to permit the plow to be conveniently turned. It will also be clear that the horizontal bar or member is capable of ready vertical adjustment to arrange it in proper position with relation to the plow-share, so that it will operate to crush and level the stubble and weeds without interfering materially with the progress of the plow. Furthermore, it will be apparent that the operating-rod also serves as a brace for rigidly holding the horizontal bar or member in its operative position at right angles to the plow-beam. The handle-bar clamps by being adjustably secured to the handle-bars of the plow may be moved backward or forward, and the horizontal bar may thereby be held either at a right angle or at any other desired angle to the plow-beam.

Having thus fully described my invention, what I claim as new, and desire to secure by Letters Patent, is—

1. A plow attachment comprising a foldable bar or member, means for hingedly connecting the same with the beam of a plow, and a combined brace and operating-rod extending rearwardly from the bar or member to the handle-bars of the plow for holding the said bar or member rigidly and for folding the same.

2. A plow attachment comprising a foldable bar or member designed to be arranged at an angle to the beam of a plow, means for connecting the inner end of the bar or member with the plow, and means for folding the bar or member and for holding the same in position for operation.

3. A plow attachment comprising a foldable bar or member adapted to be arranged at an angle to the beam of a plow, means for connecting the bar or member with the plow, an operating-rod connected with the bar or member, and means carried by the plow for engagement with the operating-rod, whereby the bar or member is rigidly held in position for operation and is also maintained in its folded position.

4. A plow attachment comprising a foldable bar or member adapted to be arranged at an angle to the beam of a plow, means for connecting the bar or member with the plow, an operating-rod connected with the bar or member, and means carried by the plow for engagement with the operating-rod, whereby the rod or member is rigidly held in position for operation and is also maintained in its folded position, the latter means being also adjustable on the plow for changing the position of the bar or member with relation to the plow-beam.

5. A plow attachment comprising a foldable bar or member, means for mounting the same on the plow, a pair of clamps provided with means for engaging the handle-bars of the plow and adjustable thereon, and a combined operating-rod and brace connected with the bar or member and having means for engaging either of the said clamps, whereby the bar or member is rigidly held in its operative and folded positions.

6. A plow attachment comprising a foldable bar or member, means for mounting the same on a plow, a pair of handle-bar clamps provided with means for adjustably engaging the handle-bars of the plow, said clamps being movable along the handle-bars and being provided with lips or flanges having openings, and a combined brace and operating-rod connected at its front end with the bar or member and provided at its rear end with means for engaging the openings of the clamps.

7. A plow attachment comprising a foldable bar or member adapted to the arranged at an angle to the beam of a plow, a vertical stem supporting the inner end of the bar or member, means for adjustably securing the stem to the beam of the plow, and bracing means connected with the foldable bar or member.

8. An attachment for plows comprising a bar or member designed to be arranged at an angle to the beam of a plow, a vertical stem supporting the inner end of the bar or member, a pair of clamping-jaws having eyes through which the said stem passes, said clamping-jaws being arranged at the upper and lower faces of the plow-beam and having means for holding them in engagement with the same, and means for maintaining the bar or member rigid with the plow-beam.

9. A plow attachment, comprising a bar or member having a vertical stem, a sleeve receiving the stem, clamping-jaws rigid with the sleeve and provided with means for engaging the beam of a plow, and means for adjustably securing the stem in the sleeve, said stem forming a pivot to permit the bar or member to fold.

10. A plow attachment comprising a foldable bar or member provided with a vertical stem forming a pivot, a bearing-sleeve receiving the pivot, and a pair of clamping-jaws having eyes through which the sleeve passes, said clamping-jaws having means for engaging the sleeve and for retaining them in engagement with the beam of a plow.

In testimony that I claim the foregoing as my own I have hereto affixed my signature in the presence of two witnesses.

OLIVER WATSON FISHER.

Witnesses:
 ABE E. ALLEN,
 A. M. GROFF.